United States Patent
Dinkel

(10) Patent No.: US 8,353,313 B2
(45) Date of Patent: Jan. 15, 2013

(54) THREE-PORT PINTLE VALVE FOR CONTROL OF ACTUATION OIL

(75) Inventor: Michael J. Dinkel, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 807 days.

(21) Appl. No.: 12/498,406

(22) Filed: Jul. 7, 2009

(65) Prior Publication Data

US 2011/0005626 A1    Jan. 13, 2011

(51) Int. Cl.
*F15B 13/04*    (2006.01)
(52) U.S. Cl. ..................... 137/596.2; 137/107
(58) Field of Classification Search ............... 137/107, 137/596.1, 596.17, 596.2, 596, 625.12, 625.25; 251/129.14, 337
See application file for complete search history.

(56) References Cited

U.S. PATENT DOCUMENTS

| | | | |
|---|---|---|---|
| 906,331 A * | 12/1908 | Struble et al. | 137/625.27 |
| 3,026,928 A * | 3/1962 | Phillips et al. | 137/45 |
| 4,100,936 A * | 7/1978 | Turion | 137/625.27 |
| 4,319,607 A | 3/1982 | Fields | |
| 4,391,292 A | 7/1983 | Millar | |
| 5,950,984 A | 9/1999 | Anderson et al. | |
| 6,109,302 A | 8/2000 | Bircann | |
| 6,598,852 B2 * | 7/2003 | Tomoda et al. | 251/129.19 |
| 6,894,751 B2 | 5/2005 | Payne et al. | |
| 6,899,313 B2 * | 5/2005 | Carrillo et al. | 251/129.18 |
| 7,021,256 B2 * | 4/2006 | Wagner et al. | 251/129.15 |
| 7,036,525 B2 * | 5/2006 | Ichinose et al. | 137/596.17 |
| 7,165,574 B2 | 1/2007 | Ryuen et al. | |
| 2004/0090296 A1 * | 5/2004 | Ojima et al. | 335/256 |
| 2011/0005481 A1 * | 1/2011 | Dinkel et al. | 137/625.17 |

* cited by examiner

*Primary Examiner* — Craig Schneider
*Assistant Examiner* — Craig J Price
(74) *Attorney, Agent, or Firm* — Thomas N. Twomey

(57) ABSTRACT

A three-port control valve assembly comprising a valve body having two valve seats facing in a common direction and disposed along a central bore terminating in an exhaust port and communicating with a supply port and a common port. A pintle shaft connected to a solenoid actuator extends into the central bore. A first valve head mounted on the pintle shaft mates with the first valve seat to connect the supply port to the common port. While the solenoid is de-energized, supply pressure keeps the first valve closed. A second valve head mates with the second valve seat to connect the common port to the exhaust port. Opening of the first valve closes the second valve via supply oil pressure. When the first valve closes, the second valve is opened by a spring disposed between the second valve head and the exhaust port.

6 Claims, 1 Drawing Sheet

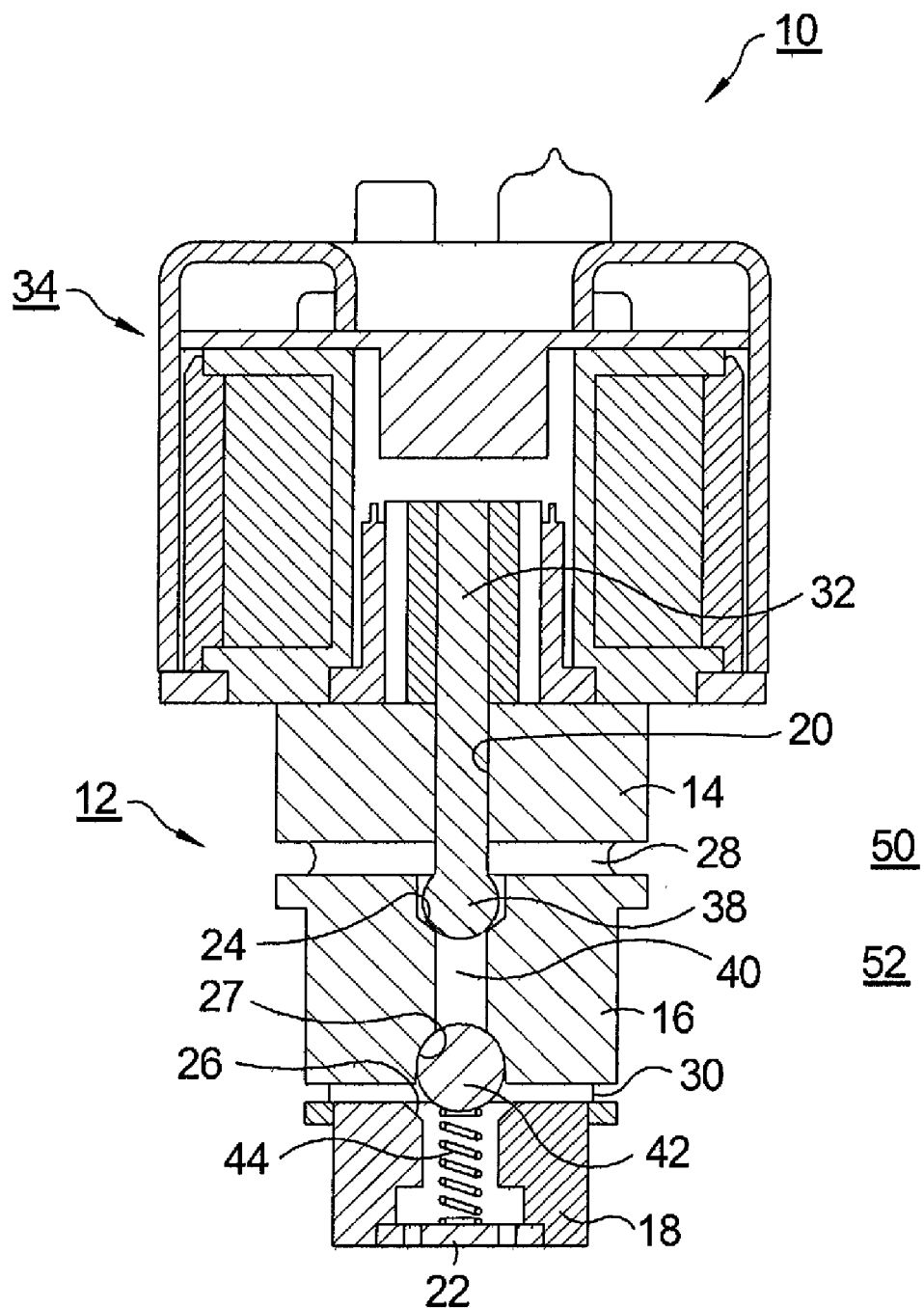

THREE-PORT PINTLE VALVE FOR CONTROL OF ACTUATION OIL

TECHNICAL FIELD

The present invention relates to valves for directing the flow of fluids; more particularly, to a pintle-type valve for controlling fluids such as actuation oil for a hydraulically-actuated variable system such as a variable valve actuation (VVA) system in an internal combustion engine; and most particularly, to a three-port pintle valve having two valve seats and two valve heads actuated by a single pintle shaft, a spring, and an electrical solenoid.

BACKGROUND OF THE INVENTION

To increase fuel economy and/or performance in internal combustion engines, various devices and systems are known in the prior art for varying the opening and closing events of intake and exhaust valves from the eccentric rotary input of the camshaft. These devices and systems are known in the art as Variable Valve Activation (VVA) systems and require a selective supply of engine oil pressure to be provided to VVA devices, such as deactivating valve lifters (DVLs), switchable roller finger followers (SRFFs), and switchable hydraulic lash adjusters (SHLAs), as are all well known in the prior art.

Hydraulic pressure to these devices typically is provided via a solenoid-controlled three-port spool valve, having a pressurized oil supply port, a common port connected to the device, and an exhaust port for bleeding oil from the device when the supply port is closed. A spool valve typically comprises a ported tubular valve body containing a ported slidable spool connected to the solenoid that is selectively shifted to connect the various ports in the valve body. A significant drawback of such a spool valve is that it requires a high degree of precision in manufacture and assembly of the spool and the body, and hence is costly to manufacture. Spool valves are also very susceptible to buildup of varnish on the spool and body walls, as well as to contamination from debris found in worn engine oil, both of which can lead to leaking and/or blowby within the valve, thus compromising performance.

What is needed in the art is an improved three-port valve that has high response, is less costly to manufacture, and is less vulnerable to varnish and contamination in use.

It is a principal object of the present invention to increase the reliability and working life of a three-port fluid control valve.

It is a further object of the invention to reduce the cost of manufacture of an internal combustion engine having VVA capability.

SUMMARY OF THE INVENTION

Briefly described, an improved three-port control valve in accordance with the invention comprises a valve body having two valve seats disposed along a central bore terminating in an exhaust port. The two valve seats face in a common direction. A supply port is in communication with the first valve seat, and a "common" port (common to both the supply and exhaust ports) is in communication with the first and second valve seats. A pintle shaft connected to an actuating linear solenoid extends through an oil seal along the central bore. A first spherical valve head is actuated directly by the pintle shaft and mates with the first valve seat to open and close the supply port to the common port. While the solenoid is de-energized, supply oil pressure keeps the first valve head on the first valve seat. A second spherical head is disposed colinearly with the pintle shaft and mates with the second valve seat to open and close the common port to the exhaust port. Opening of the first valve acts to close the second valve because supply oil pressure keeps the second valve head on the second valve seat. When the supply valve closes, the second spherical head is urged away from the second valve seat by means of a compression spring disposed between the second spherical head and the exhaust port, thus opening the common port to the exhaust port. Preferably, either or both of the second valve head and second valve seat is grooved to permit relief of pressure at the common port when the first valve is closed, thus allowing the second valve to be opened by the spring.

A three-port valve assembly in accordance with the present invention is especially suited to control of VVA devices in internal combustion engines. Further, compared to prior art three-way spool valves, such a valve assembly has much larger clearances on the moving components, making the valve assembly cheaper to manufacture and more robust to debris, and also uncovers greater flow areas.

BRIEF DESCRIPTION OF THE DRAWING

The present invention will now be described, by way of example, with reference to the accompanying drawing, in which:

FIG. 1 is an elevational cross-sectional view of a first embodiment of a three-port valve in accordance with the present invention.

The exemplification set out herein illustrates a currently-preferred embodiment of the invention, and such exemplification is not to be construed as limiting the scope of the invention in any manner.

DESCRIPTION OF THE PREFERRED EMBODIMENTS

Referring to FIG. 1, embodiment 10 is shown of an improved three-port control valve assembly in accordance with the present invention. Embodiment 10 comprises a valve body 12 defining first, second, and third portions 14,16,18, respectively, which may be formed as separate body sections assembled together or may comprise a single body section. A central longitudinal bore 20 extends through body 12 terminating in an exhaust port 22. Bore 20 is shouldered at two longitudinal locations to define first and second valve seats 24,26 (preferably conical) facing in the same direction, and an intermediate chamber 27. A supply port 28, preferably in the form of an annular groove, is in communication with first valve seat 24. A common port 30, also preferably in the form of an annular groove, is in communication with second valve seat 26, exhaust port 22, and, via chamber 27, first valve seat 24. A pintle shaft 32 connected to a linear solenoid actuator 34 extends through an oil seal (not shown) 36 into central bore 20. A first valve head 38, preferably spherical, is actuated directly by pintle shaft 32 and mates with first valve seat 24 to open and close supply port 28 to common port 30 via chamber 27 and an intermediate portion 40 of bore 20 between first and second valve seats 24,26. A second valve head 42, preferably in the form of a ball, is disposed within chamber 27 colinearly with pintle shaft 32 and mates with second valve seat 26 to open and close common port 30 to exhaust port 22. Second valve head 42 is urged to open from second valve seat 26 into chamber 27 by means of a compression spring 44 disposed between second valve head 42 and exhaust port 22.

The combination of first valve head 38 and first valve seat 24 defines a supply valve within assembly 10. The combination of second valve head 42 and second valve seat 26 defines an exhaust valve within assembly 10.

In operation, when solenoid actuator 34 is energized, pintle shaft 32 is urged away from seat 24 into the solenoid actuator 34, causing first valve head 38 to open from first valve seat 24, thus connecting supply port 28 to common port 30. Simultaneously, second valve head 42 is driven into second seat 26 by the force of pressurized fluid from supply port 28, intermediate bore portion 40, and chamber 27, thus closing common port 30 to exhaust port 22.

The reverse occurs when solenoid actuator 34 is de-energized. A return spring in actuator 34 urges first valve head 38 against first seat 24, thus closing the supply port to the common port. Spring 44 urges second valve head 42 away from second valve seat 26, thus re-opening common port 30 to exhaust port 22. Thus, valve assembly 10 is fail-safe in that the supply valve is held closed by the force of pressurized oil until actuator 34 is energized.

Preferably, one or both of second valve head 42 and second valve seat 26 is grooved (not visible in FIG. 1) to cause a deliberate small leak across the second valve. Thus, captive pressure at common port 30 when the first valve is closed is bled away to exhaust port 22, allowing the second valve to open in response to spring 44.

Valves in accordance with the present invention are especially useful in directing the operation of a VVA device 50, the incorporation and action of which within the valvetrain of an internal combustion engine 52 and controlled by an engine control module are well known in the prior art and need not be elaborated upon here.

While the invention has been described by reference to a specific embodiment, it should be understood that numerous changes may be made within the spirit and scope of the inventive concepts described. Accordingly, it is intended that the invention not be limited to the described embodiment, but will have full scope defined by the language of the following claims.

What is claimed is:

1. A three-port fluid control valve assembly for directing flow of pressurized fluid, comprising:
    a) a valve body having first and second valve seats disposed along a central bore terminating in an exhaust port and having a supply port formed in said valve body in communication with said first valve seat and having a common port formed in said valve body in communication with said first and second valve seats wherein said first and second valve seats face in the same direction;
    b) a pintle shaft extending into said central bore;
    c) a first valve head disposed within said central bore adjacent said first valve seat defining thereby a supply valve and actuated by said pintle shaft for mating with said first valve seat to open and close said supply port to said common port to control flow of said pressurized fluid to said common port;
    d) a second valve head disposed within said central bore adjacent said second valve seat for mating with said second valve seat defining thereby an exhaust valve to open and close said common port to said exhaust port, wherein said exhaust valve is closed by flow of said pressurized fluid to said common port when said supply valve is opened;
    e) a spring disposed against said second valve head for urging said second valve head away from said second valve seat to open said exhaust valve when said supply valve is closed; and
    f) an actuator operatively attached to said pintle shaft.

2. A valve in accordance with claim 1 wherein said first valve head is solidly mounted upon said pintle shaft.

3. A valve in accordance with claim 1 wherein at least one of said second valve head and said second valve seat is grooved to provide a deliberate leak across the second valve seat when said supply valve is closed.

4. A valve in accordance with claim 1 wherein said first valve head is spherical.

5. A valve in accordance with claim 1 wherein said second valve head comprises a ball.

6. An internal combustion engine comprising a variable valve actuation device, wherein said variable valve actuation device is in communication with a three-port fluid control valve assembly for directing flow of pressurized oil between an oil supply, said variable valve actuation device, and an oil exhaust, wherein said three-port fluid control valve includes:
    a valve body having first and second valve seats disposed along a central bore terminating in an exhaust port and having a supply port formed in said valve body in communication with said first valve seat and having a common port formed in said valve body in communication with said first and second valve seats wherein said first and second valve seats face in the same direction,
    a pintle shaft extending into said central bore,
    a first valve head disposed within said central bore adjacent said first valve seat defining thereby a supply valve and actuated directly by said pintle shaft for mating with said first valve seat to open and close said supply port to said common port to control flow of said pressurized fluid to said common port,
    a second valve head disposed within said central bore adjacent said second valve seat for mating with said second valve seat defining thereby an exhaust valve to open and close said common port to said exhaust port, wherein said exhaust valve is closed by flow of said pressurized fluid to said common port when said supply valve is opened,
    a spring disposed against said second valve head for urging said second valve head away from said second valve seat to open said exhaust valve when said supply valve is closed, and
    an actuator operatively attached to said pintle shaft.

* * * * *